United States Patent
Takebe et al.

(10) Patent No.: US 8,168,702 B2
(45) Date of Patent: *May 1, 2012

(54) ACRYLIC-RESIN-CONTAINING FILM, POLARIZING PLATE AND LIQUID CRYSTAL DISPLAY DEVICE USING THE SAME

(75) Inventors: Takashi Takebe, Tama (JP); Masataka Takimoto, Machida (JP); Nobuo Kubo, Hachioji (JP)

(73) Assignee: Konica Minolta Opto Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/863,706

(22) PCT Filed: Oct. 15, 2008

(86) PCT No.: PCT/JP2008/068639
§ 371 (c)(1),
(2), (4) Date: Jul. 20, 2010

(87) PCT Pub. No.: WO2009/096070
PCT Pub. Date: Aug. 6, 2009

(65) Prior Publication Data
US 2010/0292368 A1   Nov. 18, 2010

(30) Foreign Application Priority Data
Jan. 30, 2008   (JP) .................. 2008-018859

(51) Int. Cl.
*C08L 1/10* (2006.01)
*C09D 101/18* (2006.01)
(52) U.S. Cl. .......................... 524/37; 524/31
(58) Field of Classification Search ........ 524/37
See application file for complete search history.

(56) References Cited

U.S. PATENT DOCUMENTS
7,538,841 B2 *   5/2009   Murakami et al. ............ 349/117
7,815,823 B2    10/2010   Murakami et al.
2006/0216439 A1 *   9/2006   Shimizu et al. .............. 428/1.31
2007/0282038 A1 *  12/2007   Bhattacharya et al. ......... 524/31

FOREIGN PATENT DOCUMENTS

| CN | 1834705 | | 9/2006 |
|---|---|---|---|
| JP | 5-119217 | A | 5/1993 |
| JP | 5-306344 | A | 11/1993 |
| JP | 2002-356658 | A | 12/2002 |
| JP | 2003-12859 | A | 1/2003 |
| JP | 2005-146084 | A | 6/2005 |
| JP | 2007-62055 | A | 3/2007 |
| JP | 2007-191706 | A | 8/2007 |
| JP | 2007-231157 | A | 9/2007 |
| JP | 2007-233114 | A | 9/2007 |
| JP | 2007-233215 | A | 9/2007 |

OTHER PUBLICATIONS

U.S. Appl. No. 12/863,735 filed Jul. 20, 2010, Confirmation No. 9154.
Chinese Office Action dated Jan. 6, 2012 (and English translation thereof) in counterpart Chinese Application No. 200880125696.3.

* cited by examiner

*Primary Examiner* — Ling Choi
*Assistant Examiner* — Hui Chin
(74) *Attorney, Agent, or Firm* — Holtz, Holtz, Goodman & Chick, PC

(57) ABSTRACT

Object of the present invention is to provide an acrylic-resin-containing film which exhibits high transparency, high heat resistance, and markedly improved brittleness, a polarizing plate using the acrylic-resin-containing film which improves a yield of operation such as punching of a polarizing plate or bonding panels and a liquid crystal display device which can keep to exhibit excellent visibility in long-terms usage in harsh environment. These objects have been achieved by the acrylic-resin-containing film comprising a acrylic resin (A) and a cellulose ester resin (B), or comprising the acrylic resin (A), the cellulose ester resin (B) and at least a resin (D) which is other than the resins (A) and (B) and has a glass transition temperature Tg of 120-300° C. The film is characterized in that it has a haze of less than 2%, a tensile softening point of 120-150° C. and undergoes no ductile fracture.

8 Claims, 1 Drawing Sheet

ACRYLIC-RESIN-CONTAINING FILM, POLARIZING PLATE AND LIQUID CRYSTAL DISPLAY DEVICE USING THE SAME

This application is the United States national phase application of International Application PCT/JP2008/068639 filed Oct. 15, 2008.

TECHNICAL FIELD

The present invention relates to an acrylic-resin-containing film and a polarizing plate and a liquid crystal display device using the same, and in more detail to a liquid crystal display device which improves a yield of operation such as punching of a polarizing plate or bonding panels and exhibits excellent visibility in long-terms usage via using an acrylic-resin-containing film via blending of specified acrylic resins and cellulose ester resins.

BACKGROUND

Heretofore, poly methyl methacrylate (hereinafter abbreviated to as PMMA) which is typical acrylic resin is preferably used to an optical film in view of its excellent transparency, dimension stability and low hygroscopic property (Patent Document 1).

However PMMA film has poor heat resistance and has a problem that deformation occurs when used under high temperature or in long-terms usage.

This problem is important not only in a property of film itself but in a property of a polarizing plate and display device. That is, in a liquid display device, a polarizing plate is curled due to a deformation of a film resulting in curving whole panel. Therefore view angle variation or change of color occurs due to change of a retardation, even when panel is used at the position of visible surface.

In order to improve a heat resistance, proposed is a method in which polycarbonate (hereinafter abbreviated to as PC) is added in acrylic resin. However, it is difficult to use as an optical film, because usable solvent is limited and miscibility of resins is not enough and it tends to become clouded (Patent Document 2).

Disclosed is a method for introducing an aliphatic alkyl group as a copolymerization component of an acrylic resin, or a method for forming a cyclic structure in a main molecular chain via intermolecular cyclization reaction (Patent Documents 3 and 4).

However, even though these methods improve a heat resistance, brittleness of a film becomes extremely low and deterioration of brittleness accelerates a deformation of panel. Thus change of a retardation cannot be suppressed and after all, problem about view angle variation or change of color cannot be solved.

Moreover, these problems about transparency, high heat resistance and brittleness becomes more and more pronounced as a recent increase of display size, decrease of thickness of member and reduction in weight.

In the case of laminated film (for examples Patent Documents 5 and 6) of PMMA and a cellulose acetate butylate (hereinafter abbreviated to as CAB), flexibility and dimension stability under high temperature and high humidity can be improved to a certain degree. However when in an actual environment of usage of a display device, for example, a repeated and long-term change of environment between low and high temperature such as between −20° C. and 60° C. results in increasing of haze or occurring of craze at a boundary face of PMMA layer and CAB layer and it is difficult to keep displaying brilliant image stably in long term.

Patent Document 1: Japanese Patent Publication Open to Public Inspection (hereinafter referred to as JP-A) No. 5-119217
Patent Document 2: JP-A No. 5-306344
Patent Document 3: JP-A No. 2005-146084
Patent Document 4: JP-A No. 2007-191706
Patent Document 5: JP-A No. 2007-233114
Patent Document 6: JP-A No. 2007-233215

SUMMARY OF THE INVENTION

Problems to be Solved by the Present Invention

Accordingly, in view of the foregoing, the present invention was achieved. An object of the present invention is to provide a acrylic-resin-containing film which exhibits high transparency, high heat resistance, and markedly improved brittleness.

Further by using a acrylic-resin-containing film, an object of the present invention is to improve a yield of operation such as punching of a polarizing plate or bonding panels and to provide a liquid crystal display which exhibits excellent visibility in long-terms usage in harsh environment.

Means to Solve the Problems

An object of the present invention described above has been achieved by the following constitutions.

1. An acrylic-resin-containing film comprising an acrylic resin (A) and a cellulose ester resin (B), or comprising the acrylic resin (A), the cellulose ester resin (B) and at least a resin (D) which is other than the resins (A) and (B) and has a glass transition temperature Tg of 120-300° C., wherein the acrylic-resin-containing film has a haze of less than 2%, a tensile softening point of 120-150° C. and undergoes no ductile fracture.
2. The acrylic-resin-containing film of item 1, comprising 30-90% by mass of the acrylic resin (A), 5-65% by mass of the cellulose ester resin (B), and 0-50% by mass of the resin (D) which is other than the resins (A) and (B) and have a glass transition temperature Tg of 120-300° C.
3. The acrylic-resin-containing film of item 1, wherein a weight-average molecular weight of the acrylic resin (A) is 80,000-1,000,000, and at least one of the cellulose ester resins (B) has a degree of total substitution of an acyl group (T) being 2.00-2.99 and a degree of substitution of an acetyl group (ac) being 0.10-1.89, and wherein a group other than acetyl group is substituted by an acyl group having 3-7 carbon atoms, and a degree of substitution of the group (r) being 1.10-2.89, and a weight-average molecular weight is 75,000-250,000.
4. The acrylic-resin-containing film of item 1 or 2, wherein the haze is less than 1%.
5. A polarizing plate comprising the acrylic-resin-containing film of any one of items 1 to 3 onto at least one side thereof.
6. A liquid crystal display device comprising the acrylic-resin-containing film of any one of items 1 to 3.

EFFECTS OF THE INVENTION

The present invention made it possible to improve a yield of operation such as punching of a polarizing plate or bonding panels and to provide a liquid crystal display which can keep

Figure 1:
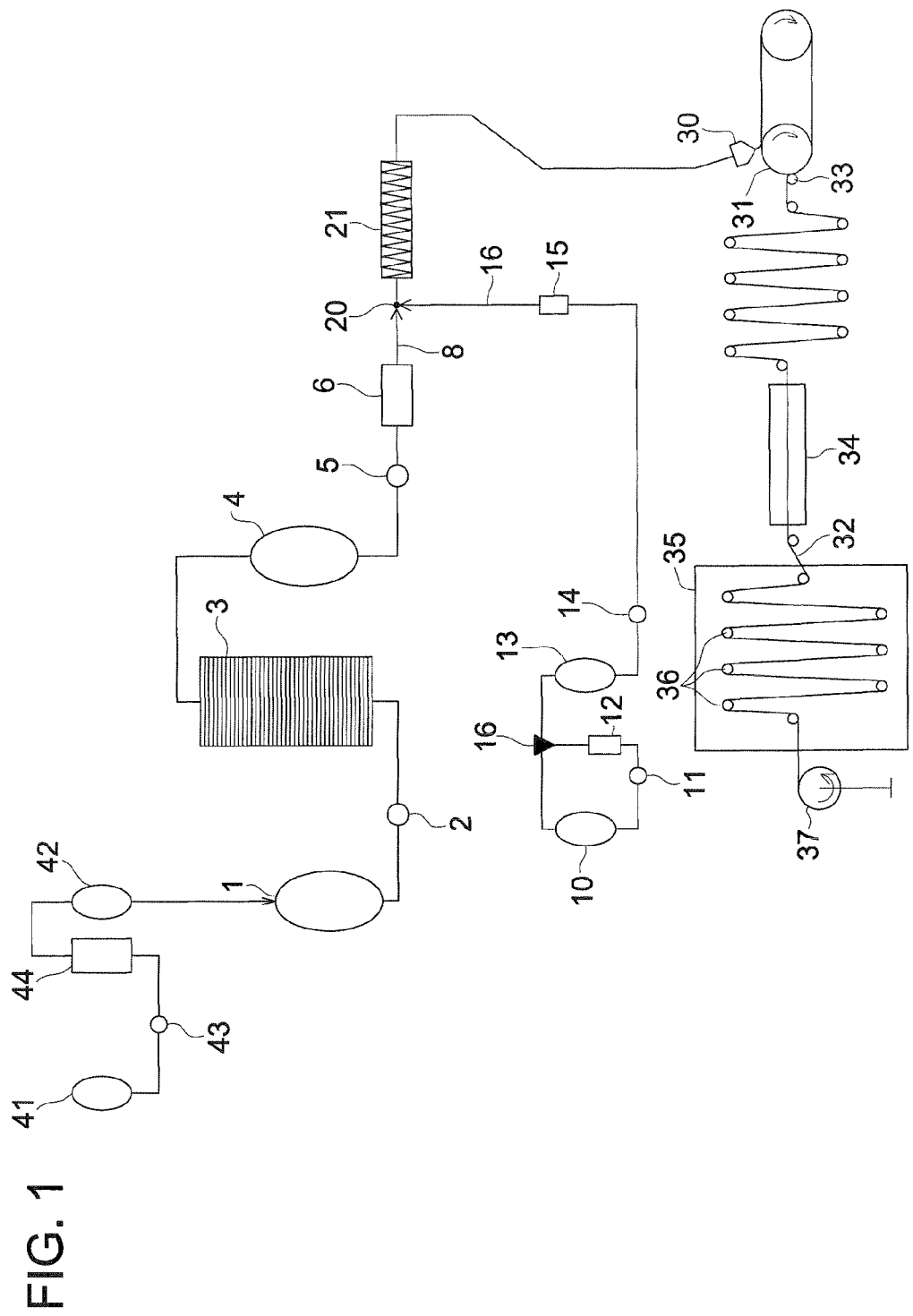
FIG. 1 is a schematic view of an example of a dope preparing process, a casting process, and a drying process of the solution casting film preparing method employed in the present invention.

DESCRIPTION OF THE NUMERALS 1 dissolving kettle
3, 6, 12, and 15 filters
4 and 13 stock kettles
5 and 14 liquid transporting pumps
8 and 16 circuit pipes
10 UV absorber mixing kettle
20 junction pipe
21 mixer
30 die
31 metal support
32 web
33 peeling position
34 tenter apparatus
35 roll dryer
41 particle preparing kettle
42 stock kettle
43 pump
44 filter

DESCRIPTION OF THE PREFERRED EMBODIMENT

The present invention and the components thereof will now be detailed.

(Acrylic-Resin-Containing Film)

An acrylic-resin-containing film of the present invention is an acrylic-resin-containing film which comprises an acrylic resin (A) and a cellulose ester resin (B), or comprising the acrylic resin (A), the cellulose ester resin (B), and at least a resin (D) which is other than the resins (A) and (B) and has a glass transition temperature Tg of 120-300° C., wherein the acrylic-resin-containing film has a haze of less than 2%, a tensile softening point of 120-150° C. and undergoes no ductile fracture.

Thus, the acrylic-resin-containing film of the present invention is characterized by comprising an acrylic resin (A), a cellulose ester resin (B), and further by comprising the acrylic resins (A), cellulose ester resin (B), and the third resin (D) which is other than the resins (A) and (B) and have a glass transition temperature Tg of 120-300° C.

The acrylic-resin-containing film of the present invention preferably comprises 30-90% by mass of acrylic resin (A), 5-65% by mass of cellulose ester resin (B), and 0-65% by mass of resin (D) which is other than the resins (A) and (B) and have a glass transition temperature Tg of 120-300° C.

More preferably, the acrylic-resin-containing film preferably comprises 50% or more by mass of acrylic resin (A). When a content of a component of an acrylic resin becomes higher, dimension stability under high temperature and high humidity can be suppressed, curl of a polarizing plate or curving whole panel can be extremely decreased and result in keeping above performances in long-term usage.

According to the present invention, a ductile fracture is defined as a breaking with extreme elongation or squeezing of a material to a final subsidiary fracture due to act higher stress than an intensity of a material. Innumerable depressions called dimple are characteristically formed on the fracture surface.

Therefore "acrylic-resin-containing film which shows no ductile fracture" is characterized by no breaking such as a subsidiary fracture even when acting large stress such as double up under the condition of 23° C., 55% R.H.

In accordance with large-sizing and thin-filming of an optical film due to large-sizing of liquid display device in recent years, in the view of a re-workability and a productivity, requirement for improving brittleness of an optical film increases more and more and it is required not to occur above ductile fracture.

An acrylic-resin-containing film without ductile fracture can be achieved by using the material constitution of the present invention such as acrylic resin, cellulose ester and other additives and by selecting via a ductile fracture test described later.

The acrylic-resin-containing film related to the present invention preferably has low haze and 120-145° C. of a tensile softening point, more preferably is controlled in 125-140° C. considering an instrument of high temperature such as projector or an in-car display device under a high temperature circumstance.

In the acrylic-resin-containing film related to the present invention, a number of defects having diameter of 5 μm or more in a film surface are preferably 1-/10 cm square, more preferably 0.1-/10 cm square.

Herein, a diameter of a defect means a diameter when the defect is circle and when the defect is not circle, a maximum size (a circumscribed circle diameter) decided by observation of bounds of the defect via microscope via a method below.

When a defect is a bubble or a foreign material, bounds of the defect is observed as a size of a shadow by transmitted light of a differential interference microscope. When a defect is a change of a surface geometry such as a transfer printing of a blem on a roll or a scratch, a size of the defect is confirmed by a reflected light of a differential interference microscope.

Herein, when a size of a defect is indefinite by the observation of reflected light, aluminum or platinum is vapor-deposited on the surface and then is observed.

In order to obtain a film in high productivity having excellent performance represented by this defect frequency, it is effective to filter a polymer solution precisely just before casting, to maintain high cleanness around casting machines, and to dry effectively suppressing foam formation by setting a stepwise drying condition after casting.

For example, when a number of defects are 1-/10 cm square or more and a tension is applied to the film at after treatment process, a breaking of the film may occur from defect as origin and productivity may extremely decrease. Further when a diameter of a defect exceeds 5 μm or more, the defect can be observed by visual inspection through a polarizing plate and a bright spot may occur in the case of using as an optical member.

Even in the case that a defect cannot be observed by a visual inspection, a defect (coating defect) may be appeared because that coating material cannot be coated uniformly when a hard coat layer is formed onto the film. Herein, the defect means a void (bubble defect) due to a rapid evaporation of a solvent in a drying step of a solution casting method or a foreign matter (foreign matter defect) due to a foreign matter in casting liquid or contamination during casting step.

Further, in the acrylic-resin-containing film of the present invention, a breaking elongation at least of one direction based on JIS-K7127-1999 is preferably 10% or more, more preferably 20% or more.

The upper limit of the breaking elongation is not limited thereto and is 250% realistically. In order to increase breaking elongation, it is effective to reduce a foreign matter or defect in film due to bubble.

The film thickness of the acrylic-resin-containing film of the present invention is preferably 20 μm or more and more preferably 30 μm or more.

The upper limit of the film thickness is not limited thereto. In the case of forming film via solution casting method, the upper limit is about 250 μm in view of coating property, forming bubble and drying solvent.

In the acrylic-resin-containing film of the present invention, a transmittance of all light is preferably 90% or more, more preferably 93% or more and the upper limit is about 99% realistically.

In order to achieve the transmittance of all light, it is effective not to introduce additive or copolymerization component which absorb visible light, or to reduce light diffusion or absorption in the film by eliminating foreign material in polymer by precise filtration.

Further, it is also effective to reduce light diffusion or absorption at the surface of the film by decreasing a surface roughness of the film by decreasing a surface roughness of the contact member (such as cooling roll, calendar roll, drum, belt, casting substrate in the case of solution casting method and conveyance roll) to the film in a film casting step, or by decreasing a refractive index of an acrylic resin.

In the acrylic-resin-containing film of the present invention, a haze value which is one of index of transparency is preferably less than 2.0%, more preferably less than 1.0%.

Further, in view of luminance and contrast in the case of installing into a liquid crystal display device, less than 0.5% is preferred.

In order to achieve the haze value, it is effective to reduce light diffusion in the film by eliminating foreign material in polymer by precise filtration.

<Acrylic Resin (A)>

Acrylic resins employed in the present invention include methacrylic resins. These resins are not particularly limited, and preferred resins include those which are composed of methyl methacrylate units of 50-99% by mass and other monomer units of 1-50% by mass which are copolymerizable with the above.

Other copolymerizable monomers include α,β-unsaturated acids such as alkyl methacrylate, in which the number of carbon atoms of the alkyl group is 2-18, alkyl acrylate, in which the number of carbon atoms of the alkyl group is 1-18, acrylic acid, or methacrylic acid; unsaturated groups containing divalent carboxylic acids such as maleic acid, fumaric acid, or itaconic acid; aromatic vinyl compounds such as styrene, α-methylstyrene or nuclear substituted styrene; and α,β-unsaturated nitriles such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

In view of a mechanical strength of a film and a fluidity at a film production process, acrylic resin (A) employed in the acrylic-resin-containing film of the present invention has preferably the weight average molecular weight (Mw) of 80,000 to 1,000,000.

It is possible to determine the weight average molecular weight of acrylic resins of the present invention via gel permeation chromatography. Measurement conditions are as follows.

Solvent: methylene chloride
Columns: Shodex K806, K805, and K803G (produced by Showa Denko K. K., three columns were employed via connections)
Column temperature: 25° C.
Sample concentration: 0.1% by mass
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp. Mw=2,800,000–500) was employed. It is preferable to employ the 13 samples at nearly equal intervals.

The manufacturing methods of acrylic resin (A) in the present invention are not particularly limited, and employed may be any of the conventional methods such as suspension polymerization, emulsion polymerization, bulk polymerization, or solution polymerization. As a polymerization initiator, employed may be common peroxide based and azo based ones. Further, redox based ones may be included.

With regard to polymerization temperature, the suspension or emulsion polymerization may be carried out between 30 and 100° C., while the bulk or solution polymerization may be carried out between 80 and 160° C. In order to control the reduction viscosity of the resulting copolymer, polymerization may be carried out employing alkylmercaptan as a chain transfer agent.

By using this molecular weight, both heat resistance and brittleness can be improved.

As the acrylic resin (A) according to the present invention, also employed may be commercial ones. Examples thereof include DERPET 60N and 80N (both produced by Asahi Kasei Chemicals Co., Ltd.), DIANAL BR52, BR80, BR83, BR85, and BR88 (all manufactured by Mitsubishi Rayon Co., Ltd.), and KT75 (produced by Denki Kagaku Kogyo K. K.).

As the acrylic resins according to the present invention, one or more species of the acrylic resin (A) is used and a weight-average molecular weight of each acrylic resin (A) is 80,000 to 1,000,000.

<Cellulose Ester Resin (B)>

As the acrylic resins according to the present invention, one or more species of the cellulose ester resin (B) is used. In at least one of them, total substitution degree (T) of the acyl group is 2.00-2.99, the substitution degree of the acetyl group (ac) is 0.10-1.89, groups other than acetyl group are substituted by acyl groups having 3-7 carbon atoms and the substitution degree (r) is 1.10-2.89, and having a weight-average molecular weight (Mw) of 75,000 to 250,000. (Hereinafter referred to as cellulose ester resin (B1))

As cellulose ester resin (B) other than cellulose ester resin (B1) (hereinafter referred to as cellulose ester resin (B2)), selected is a cellulose having the total substitution degree of the acyl group (T) is 1.00-2.99, the substitution degree of the acetyl group (ac) is 0.10-2.99, and the substitution degree of other than acetyl group (r) is 0-2.89.

Cellulose ester resin (B1) and Cellulose ester resin (B2) are usable at the ratio of 100/0-50/50 by mass.

Cellulose ester resin (B1) and Cellulose ester resin (B2) may be used one or more species.

When Cellulose ester resin (B) according to the present invention is an ester with aliphatic acyl group, the aliphatic acyl group has the number of carbon atoms of 2-20. Specific example includes propyonyl, butylyl, isobutylyl, valeryl, hexanoyl, octanoyl, lauroyl and stearoyl group.

According to the present invention, the aliphatic acyl group means including further substituent. As the substituent, substituent of benzene ring is exemplified when the aromatic ring is benzene ring in above aliphatic acyl group.

When above Cellulose ester resin (B) is an ester with aromatic acyl group, the number of substituent X substituted onto an aromatic ring is 0 or 1-5, preferably 1-3, most preferably 1 or 2.

Further, when the number of substituents substituted onto an aromatic ring is at least 2, they may be the same or differ. Further, they may be combined to form condensed polycyclic compounds (for example, naphthalene, indene, indan, phenanthrene, quinoline, isoquinoline, chromene, chroman, phthalazine, acridine, indole, and indoline).

In above Cellulose ester resin (B), at least one structure selected from the structure of substituted or unsubstituted aliphatic acy group or substituted or unsubstituted aromatic acy group may be used as the structure of cellulose ester resin of the present invention. These may be single or mixed acid ester of cellulose.

Cellulose ester resin (B) according to the present invention is preferably those having an acyl group having 2-7 carbon atoms as a substituent, namely one type selected particularly from cellulose acetate, cellulose propionate, cellulose butyrate, cellulose acetate propionate, cellulose acetate butyrate, cellulose acetate benzoate, and cellulose benzoate.

Of these, particularly preferred Cellulose ester resin (B) includes cellulose acetate, cellulose propionate, cellulose butyrate, cellulose acetate propionate, or cellulose acetate butyrate.

As mixed fatty acid, more preferred is a short-chain fatty acid ester of cellulose acetate propionate or cellulose acetate butyrate, having an acyl group having 2-4 carbon atoms as a substituent.

A portion which is not substituted with the acyl group commonly exists as a hydroxyl group. It is possible to synthesize these via common methods known in the art.

The substitution degree of the acetyl group and other acyl groups refers to the value determined by the method specified in ASTM-D817-96.

Weight average molecular weight (Mw) of the cellulose ester resin (B1) according to the present invention is preferably in the range of 75,000-250,000, is more preferably in the range of 100,000-240,000.

<Resin (D) Other than the Resins (A) and (B) and Having a Glass Transition Temperature Tg of 120-300° C.>

A resin (D) according to the present invention is a resin other than the resins (A) and (B) and has a glass transition temperature Tg of 120-300° C. The acrylic-resin-containing film of the present invention may be composed of various kinds of resin (D), as long as its function as an acrylic-resin-containing film is not adversely affected.

Specific example include: copolymer of divalent carbonic acid derivative having unsaturated group such as methyl (meth)acrylate-styrene resin (styrene ratio exceed 50 mol %), styrene-maleic anhydride, styrene-fumaric acid, styrene-itaconic acid, and styrene-N-substituted maleimide; with aromatic vinyl compound such as styrene, a-methyl styrene and nuclear substituted styrene; indene copolymer such as indene-styrene resin and indene-methyl(meth)acrylate resin (ratio of indene exceed 50 mol % in case of copolymer with acrylate), olefine-maleimide copolymer, (meth)acrylate including lactone structure, glutaric acid structure and glutaric imide structure in the molecular chain; polycarbonate, polycyclo olefin and octaacetyl succharose.

Methyl(meth)acrylate-styrene resin and indene-methyl (meth)acrylate copolymer is preferably used due to good compatibility.

Resin (D) of the present invention has Tg of not less than 120° C. and not more than 300° C. In order to increase heat resistance, one having higher Tg is preferable.

Compatibility is preferred to be tested preliminarily for selecting resin (D) which can be mixed with resin (A) and resin (B).

For example, compatibility test is evaluated as follows: 5% solution of resin (A), resin (B) and resin (D) each dissolved in 100 ml of methylene chloride are mixed and followed by turbidity measurement and observation of mixing state by visual inspection. By using this test, resin can be selected simply.

<Acrylic Particles (C)>

According to the present invention, acrylic particles (C) may be included in the acrylic-resin-containing film. In the case of using acrylic particles (C), it is effective to decrease a difference of refractive index between acrylic resin (A) and acrylic particles (C).

Further, because a surface roughness also affect haze value as a surface haze, it is effective to control a diameter and a content of Acrylic particles (C) in above range or to reduce surface roughness of the contact member in a film casting step.

Acrylic particles (C) according to the present invention preferably exist in a particle state (hereinafter also referred to as a immiscible state) in an acrylic-resin-containing film incorporating above acrylic resin (A) and cellulose ester resin (B).

For example, when predetermined amount of prepared acrylic-resin-containing film was sampled and dissolved by stirring in solvent to fully solved and dispersed, followed by filtering by using membrane filter made of PTFE having pore size less than average particle diameter of Acrylic particles (C), it is preferable that a weight of a insoluble matter captured by filtering is 90% by mass or more of an amount of the Acrylic particles (C) added in to the acrylic-resin-containing film.

Acrylic particles (C) of the present invention is not limited thereto, but it is preferable to be Acrylic particles (C) having 2 or more layer structure, especially acrylic particle complex having multi-layer structure described below.

"Multilayer structure acrylic granular complex", as described herein, refers to a granular acrylic polymer having a multilayer structure in which an innermost hard layer polymer, a crosslinked soft layer polymer having rubber elasticity and an outermost soft layer polymer are stacked in layers toward the periphery from the center.

As a preferred embodiment of the multilayer structure acrylic granular complex employed in the acrylic resin composition according to the present invention, listed is the one described below: an acrylic granular complex which incorporates a 3-layer structure composed of (a) an innermost hard layer polymer which is prepared by polymerizing a monomer mixture of 80-98.9% by mass of methyl methacrylate, 1-20% by mass of alkyl acrylate in which the number of carbon atoms of the alkyl group is 1-8, and 0.01-0.3% by mass of polyfunctional grafting agents, (b) a crosslinked soft layer polymer which is prepared by polymerizing, in the presence of the above innermost hard layer polymer, a monomer mixture of 75-98.5% by mass of alkyl acrylate in which the number of carbon atoms of the alkyl group 4-8, 0.01-5% by mass of polyfunctional crosslinking argents, and 0.5-5% by mass of functional grafting agents, and (c) an outermost hard layer polymer which is prepared by polymerizing, in the presence of the polymer composed of the above innermost hard layer and crosslinked soft layer, a monomer mixture of 80-99% by mass of methyl methacrylate, 1-20% by mass of alkyl acrylate in which the number of carbon atoms of the alkyl group of 1-8, and the resulting 3-layer structure polymer is composed of 5-40% by mass of innermost hard layer polymer (a), 30-60% by mass of soft layer polymer (b), and 20-50% by mass of outermost hard layer polymer (c), and when being subjected to fraction via acetone, an insoluble portion exists and the methyl ethyl ketone swelling degree of the above insoluble portion is 1.5-4.0.

As disclosed in Japanese Patent Publications No. 60-17406 and 3-39095, not only by specifying the composition of each layer of the multilayer structure acrylic granular complex and the particle size, but also by setting the pulling elastic modulus of the multilayer structure acrylic granular complex and the methyl ethyl ketone swelling degree of the acetone-insoluble portion within the specified range, it is possible to realize a sufficient balance between the impact resistance and the stress resistance whitening properties.

It is preferable that innermost hard layer polymer (a), which constitutes the multilayer structure acrylic granular complex, is prepared by polymerizing a monomer mixture composed of 80-98.9% by mass of methyl methacrylate, 1-20% by mass of alkyl acrylate in which the number of carbon atoms of the alkyl group is 1-8, and 0.01-0.3% by mass of polyfunctional grafting agents.

Alkyl acrylates, in which the number of carbon atoms of the alkyl group is 1-8, include methyl acrylate, ethyl acrylate, n-propyl acrylate, n-butyl acrylate, s-butyl acrylate, and 2-ethylhexyl acrylate, and of these, preferably employed are methyl acrylate and n-butyl acrylate.

The ratio of alkyl acrylate units in innermost hard layer polymer (a) is commonly 1-20% by mass.

Polyfunctional grafting agents include polyfunctional monomers, having different polymerizable functional groups, such as allyl ester with acrylic acid, methacrylic acid, maleic acid, and fumaric acid, and allyl methacrylates are preferably employed.

Polyfunctional grafting agents are employed to chemically combine the innermost hard layer polymer and the soft layer polymer. The ratio when employed in the innermost hard layer polymerization is 0.01-0.3% by mass.

As crosslinked soft layer polymer (b) which constitutes an acrylic granular complex, preferred is one which is prepared by polymerizing, in the presence of above innermost hard layer polymer (a), a monomer mixture of 75-98.5% by mass of alkyl acrylate in which the number of carbon atoms of the alkyl group is 1-8, 0.01-5% by mass of polyfunctional crosslinking agents, and 0.5-5% by mass of polyfunctional grafting agents.

As an alkyl acrylate in which the number of carbon atoms of the alkyl group is 4-8, preferably employed are n-butyl acrylate and 2-ethylhexyl acrylate.

Further, together with these polymerizable monomers, it is possible to copolymerize other monofunctional monomers at 25% by mass or less which are copolymerizable.

Other monofunctional monomers which are copolymerizable include styrene and substituted styrene derivatives. With regard to the ratio of alkyl acrylates in which the number of carbon atoms of the alkyl group is 4-8 to styrene, as the former ratio increases, the glass transition temperature of polymer (b) is lowered, whereby softness is achievable.

On the other hand, in view of transparency of resin compositions, it is advantageous to approach the refractive index of soil layer polymer (b) at normal temperature to that of innermost hard layer polymer (a), outermost hard layer polymer (c), and thermally plastic hard acrylic resins. Upon considering the above, the ratio of both is chosen.

For example, in case of usage for thinner thickness of covered layer, styrene is not necessary to be copolymerized.

As a polyfunctional grafting agent, employed may be ones cited in the item of above innermost layer hard polymer (a).

Polyfunctional grafting agents employed herein are employed to chemically combine soft layer polymer (b) and outermost hard layer polymer (c), and in view of providing of targeted impact resistance effects, the ratio employed during the innermost hard layer polymerization is preferably 0.5-5% by mass.

As an employable polyfunctional crosslinking agent may be commonly known crosslinking agents such as divinyl compounds, diallyl compounds, or dimethacryl compounds. Of these, preferably employed are polyethylene glycol diacrylates (at a molecular weight of 200-600).

Polyfunctional crosslinking agents, employed herein, are employed to realize effects of impact resistance via formation of a crosslinking structure during polymerization of soft layer (b).

However, when the above polyfunctional grafting agents are employed during polymerization of the soft layer, the crosslinking structure in soft layer (b) is formed to some extent. Accordingly, polyfunctional crosslinking agents are not essential components. In view of targeted effects to provide impact resistance, the ratio of polyfunctional crosslinking agents during soft layer polymerization is preferably 0.01-5% by mass.

As outermost hard layer polymer (c) which constitutes a multilayer structure acrylic granular complex, preferred is one which is prepared, in the presence of the above innermost hard layer polymer (a) and soft layer polymer (b), by polymerizing a monomer mixture composed of 80-99% by mass of methyl methacrylate and 1-20% by mass of alkyl acrylate in which the number of carbon atoms in the alkyl group is 1-8.

As alkyl acrylates, employed are those described above, and of these, preferably employed are methyl acrylate and ethyl acrylate. The ratio of alkyl acrylate units in uppermost hard layer (c) is preferably 1-20% by mass.

Further, to enhance miscibility with acrylic resin (A) during polymerization of outermost hard layer (c), it is possible to employ mercaptan as a chain transfer agent to regulate the resulting molecular weight.

In particular, to improve the balance between elongation and impact resistance, it is preferable to result in a gradient so that the molecular weight gradually decreases from the interior to the exterior. A specific method is as follows. A monomer mixture to form the outermost hard layer is divided into at least two parts. By a technique in which chain transfer agents, which are added each time, are gradually increased, it is possible to decrease the molecular weight of polymers to form the outermost hard layer from the interior of the multilayer structure acrylic granular complex to the exterior.

It is possible to check the molecular weight during the above formation as follows. The monomer mixture employed each time is individually polymerized under the same conditions, and the molecular weight of the resulting polymer is determined.

The diameter of acrylic particles (C) preferably employed in multilayer structure polymer of the present invention is not particularly limited. The above diameter is preferably 10-1,000 nm, is more preferably 20-500 nm, but is most preferably 50-400 nm.

In the acrylic granular complex, which is the multilayer structure polymer preferably employed in the present invention, the weight ratio of the core and the shell is not particularly limited. When the entire multilayer structure polymer is assigned at 100 parts by mass, the core layer occupies preferably 50-90 parts by mass, but occupies more preferably 60-80 parts by mass.

Examples of commercial products of the above multilayer structure acrylic granular complex include "METABLEN" produced by Mitsubishi Rayon Co., Ltd., "KANEACE" produced by Kaneka Corp., "PARALOID" produced by Kureha Chemical Industry Co., Ltd., "ACRYLOID" produced by Rohm and Haas Co., "STAFILOID" produced by Ganz Chemical Industry Co., and "PARAPET SA" produced by Kuraray Co., Ltd. These products may be employed individually or in combinations of at least two.

Further, specific examples of acrylic particles (c-1), which are composed of graft copolymers, appropriately employed as acrylic particles (C) preferably employed in the present invention, include graft polymers which are prepared by copolymerizing, in the presence of rubber polymers, a mixture of monomers composed of unsaturated carboxylic acid ester based monomers, unsaturated carboxylic acid based monomers, and aromatic vinyl based monomers, as well as if desired, other vinyl based monomers which are copolymerizable with the above.

Rubber polymers employed in acrylic particles (c-1), which are graft copolymers, are not particularly limited, and diene based rubber, acryl based rubber, and ethylene based rubber are employable. Specific examples thereof include polybutadiene, styrene-butadiene copolymers, styrene-butadiene block copolymers, acrylonitrile-butadiene copolymers, butyl acrylate-butadiene copolymers, polyisoprene, butadiene-methyl methacrylate copolymers, butyl acrylate-methyl methacrylate copolymers, butadiene-ethyl acrylate copolymers, ethylene-propylene copolymers, ethylene-propylene-diene based copolymers, ethylene-isoprene copolymers, and ethylene-methyl acrylate copolymers. These rubber polymers may be employed individually or in combinations of at least two types.

Further, in view of preparation of a highly transparent acrylic-resin-containing film of the present invention, it is preferable that the refractive index of acrylic resin (A) is near that of acrylic particles (C). Specifically, any difference in the refractive index between acrylic particles (C) and acrylic resin (A) is preferably at most 0.05, is more preferably at most 0.02, but is most preferably at most 0.01.

In order to satisfy the above refractive index conditions, it is possible to decrease the difference in refractive index by employing a method in which each monomer unit composition ratio is regulated, and/or a method in which the composition ratio of employed rubber polymers or monomers is regulated, whereby it is possible to prepare an acrylic-resin-containing film which excels in transparency.

"Difference in refractive index", as described herein, refers to the following. The acrylic-resin-containing film of the present invention is sufficiently dissolved in acrylic resin (A) dissolvable solvents under optimal conditions to prepare a milky-white solution. The resulting solution is separated into a solvent soluble portion and a solvent insoluble portion via an operation such as centrifugal separation. Subsequently, each of the soluble portion (acrylic resin (A)) and the insoluble portion (acrylic particles (C)) is purified. Thereafter, each refractive index is determined (at 23° C. and 550 nm wavelength), whereby the difference is obtained.

Methods to blend acrylic resin (A) with acrylic particles (C) in the present invention are not particularly limited. A method is preferably employed in which after blending acrylic resin (A) with other optional components, the resulting blend is homogeneously melt-kneaded via a uniaxial or biaxial extruder while adding acrylic particles (C).

Further, it is possible to employ a method in which a solution, into which acrylic particles (C) have been dispersed, is mixed with a solution (being a dope solution) which is prepared by dissolving acrylic resin (A) and cellulose ester resin (B) in solvents, and a method in which a solution which is prepared by dissolving acrylic particles (C) and other optional additives in solvents is added in-line.

It is possible to employ, as the acrylic particles according to the present invention, commercial products. Examples thereof may include METABLEN W-341 (C2) (produced by Mitsubishi Rayon Co., Ltd.) and CHEMISNOW MR-2G (C3) and MS-300X (C4) (produced by Soken Chemical & Engineering Co., Ltd.).

The acrylic-resin-containing film of the present invention incorporates acrylic particles (C), preferably in the amount range of 0.5-45% by mass with respect to the total mass of resins constituting the above film.

<Other Additives>

In the acrylic-resin-containing film of the present invention, in order to enhance fluidity and flexibility of the composition, it is possible to simultaneously employ plasticizers.

Plasticizers may be phthalic acid based, aliphatic acid ester based, trimellitic acid ester based, phosphoric acid ester base, polyester based, or epoxy based.

Of these, polyester based and phthalic acid based plasticizers are preferably employed. The polyester based plasticizers excel in non-mobility and extraction resistance, compared to phthalic acid ester based plasticizers such as dioctyl phthalate, but are slightly inferior in plasticizing effects and miscibility.

Consequently, by selecting or simultaneously employing these plasticizers depending on intended use, they may fill a wide range of applications.

Polyester based plasticizers are reactants of uni- to tetravalent carboxylic acid with uni- to hexahydric alcohol, and those, which are prepared by allowing divalent carboxylic acid to react with glycol, are mainly employed. Representative divalent carboxylic acids include glutaric acid, itaconic acid, adipic acid, phthalic acid, azelaic acid, and sebacic acid.

Particularly, the use of adipic acid and phthalic acid enables preparation of those which excel in plasticizing characteristics. Glycols include glycol of ethylene, propylene, 1,3-butyrene, 1,4-butyrene, and dipropylene.

These divalent carboxylic acids and glycols may be employed individually or in combinations.

The above ester based plasticizers may be any of the ester, oligoester or polyester type. The molecular weight is preferably in the range of 100-10,000, but is more preferably in the range of 600-3,000, at which range plasticizing effects are more enhanced.

Further, viscosity of plasticizers correlates with their molecular structure and weight. In the case of adipic acid based plasticizers, the viscosity is preferably in the range of 200-5,000 MP·s (at 25° C.) from the relation with plasticization efficiency. Further, several polyester based plasticizers may be simultaneously employed.

It is preferable that 0.5-30 parts by mass of plasticizers are added to 100 parts by mass of the composition containing the acrylic resin (A). However, it is not preferable that in practice, the added amount of the plasticizers exceeds 30 parts by mass, since the surface becomes sticky.

It is preferable that the composition containing the acrylic resin (A) of the present invention incorporates UV absorbers. Employed UV absorbers include those which are benzotriazole based, 2-hydroxybenzophenone based, and salicylic acid phenyl ester based. For example, cited may be triazoles such as 2-(5-methyl-2-hydroxyphenyl)benzotriazole, 2-[2-hydroxy-3,5-bis(α,α-dimethylbenzyl)phenyl]-2H-benzotriazole, or 2-(3,5-di-t-butyl-2-hydroxyphenyl)benzotriazole, as well as benzophenones such as 2-hydroxy-4-methoxybenzophenone, 2-hydroxy-4-octoxybenzophenone, or 2,2'-dihydroxy-4-methoxybenzophenone.

Of UV absorbers, those having a molecular weight of at least 400 exhibit a high boiling point and are neither easily volatized nor scattered during molding at high temperature. Consequently, it is possible to effectively improve weather resistance via their addition of a relatively small amount.

Further, it is preferred in view that a content of included UV absorbers can be maintained in long term and an effect of improvement for weather resistance continues excellently due to low transitivity especially from thin covered layer to substrate layer and low tendency to precipitation to a surface of laminated sheet.

UV absorbers having a molecular weight of at least 400 include benzotriazole based ones such as 2-[2-hydroxy-3,5-bis(α,α-dimethylbenzyl)phenyl]-2-benzotriazole, or 2,2-methylenebis[4-(1,1,3,3-tetrabutyl)-6-(2H-benzotriazole-2-yl)phenol; hindered amine based ones such as bis(2,2,6,6tetramethyl-4-piperidyl)sebacate or bis(1,2,2,6,6-pentamethyl-4-piperidyl)sebacate; further hybrid based ones having hindered phenol and hindered amine structures in the molecule such as 2-(3,5-di-t-butyl-4-hydroxybenzyl)-2-n-butylmalonic acid bis(1,2,2,6,6-pentamethyl-4-piperidyl) or 1-[2-[3-(3,5-di-t-butyl-4-hydroxyphenyl)propionyloxy]2,2,6,6-tetramethylpyperidine. These may be employed individually or in combinations of at least two types. Of these, particularly preferred are 2-[2-hydroxy-3,5-bis(α,α-dimethylbenzyl)phenyl]-2-benzotriazole and 2,2-methylenebis[4-(1,1,3,3-tetrabutyl)-6-(2H-benzotriazole-2-yl)phenol.

Further, in order to minimize thermal decomposition and thermal staining during molding, it is possible to add various antioxidants to acrylic resin (A) used in the acrylic-resin-containing film of the present invention. Still further, by the addition of antistatic agents, it is possible to provide the acrylic-resin-containing film with antistatic capability.

In the acrylic resin composition of the present invention, fire resistant acrylic resin compositions blended with phosphor based fire retardants may be employed.

As phosphor based fire retardants employed here, listed may be mixtures incorporating at least one selected from red phosphorous, triaryl phosphoric acid esters, diaryl phosphoric acid esters, monoaryl phosphoric acid esters, aryl phosphoric acid compounds, aryl phosphine oxide compounds, condensed aryl phosphoric acid esters, halogenated alkyl phosphoric acid esters, halogen-containing condensed phosphoric acid esters, halogen-containing condensed phosphoric acid esters, and halogen containing phosphorous acid esters.

Specific examples thereof include triphenyl phosphate, 9,10-dihydro-9-oxa-10-phosphaphenantholene-10-oxide, phenylphosphonic acid, tris(β-chloroethyl)phosphate, tris(dichloropropyl)phosphate, and tris(tribromoneopentyl)phosphate.

<Film Production>

Examples of the production method of an acrylic-resin-containing film will now be described, however the present invention is not limited thereto.

As an acrylic-resin-containing film production method, employed may be an inflation method, a T-die method, a calendering method, a cutting method, a casting method, an emulsion method, or a hot press method. In view of coloration retardation, reduction of foreign matter defects, and decrease in optical defects of the die line, preferred is solution film production employing a casting method.

(Organic Solvents)

When the acrylic-resin-containing film of the present invention is produced via the solution casting method, as useful organic solvents to form a dope, any solvent may be employed without limitation as long as it simultaneously dissolves acrylic resin (A), cellulose ester resin (B), resin (D) and other additives.

Examples thereof may include, as chlorine based organic solvents, methylene chloride, and as non-chlorine based organic solvents, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,-hexafluoro-2-methyl-2-propanol, 1,1,1,3,3,3-hexafluoro-2-propanol, 2,2,3,3,3-pentafluoro-1-propanol, and nitroethane. The methylene chloride, methyl acetate, ethyl acetate, and acetone are preferably employable.

It is preferable that other than the above organic solvents, incorporated in the dope, are aliphatic alcohols having a straight or branched chain having 1-4 carbon atoms in an amount of 1-40% by mass. As the alcohol ratio in the dope increases, the resulting web is gelled, whereby peeling from a metal support become easier. Further, as the ratio of alcohol is low, it enhances dissolution of acrylic resin (A) and cellulose ester resin (B) in non-chlorine based organic solvents.

Specifically, a dope composition is preferred which is prepared by dissolving, in solvents incorporating methylene chloride and aliphatic alcohols having a straight or branched chain having 1-4 carbon atoms, three of acrylic resin (A), cellulose ester resin (B), and a resin (D) in an total amount of 15-45% by mass.

As aliphatic alcohols having a straight or branched chain having 1-4 carbon atoms, listed may be methanol, ethanol, n-propanol, iso-propanol, n-butanol, sec-butanol, and tert-butanol.

The preferable film production method of the acrylic-resin-containing film of the present invention will now be described.

1) Dissolution Process

A dissolution process prepares a dope in such a manner that acrylic resin (A), cellulose ester resin (B), resin (D) and additives are dissolved, while stirring, in organic solvents mainly composed of good solvents for above acrylic resin (A), cellulose ester resin (B) and resin (B) employing a dissolution kettle, or prepares a dope which is a major dissolution liquid by blending, in some cases, other additive solutions with above acrylic resin (A), cellulose ester resin (B) solution and resin (B) solution.

It is possible to dissolve acrylic resin (A), cellulose ester resin (B) and resin (D) via various dissolution methods such as: a method in which dissolution is carried out at normal pressure, a method in which dissolution is carried out at the temperature of at most the boiling point of the major solvent, a method employing any of the cooling dissolution methods described in JP-A Nos. 9-95544, 9-95557, and 9-95538, a method, described in JP-A No. 11-21379, in which dissolution is carried out under high pressure. Of these, preferred is the method in which dissolution is carried out at the temperature of at least the boiling point of the major solvent under pressure application.

The total concentration of three components such as acrylic resin (A), cellulose ester resin (B) and resin (D) in a dope is preferably in the range of 15-45% by mass. Additives are added to the dope during or after dissolution. After dissolution or dispersion, the resulting mixture is filtered via a filter and defoamed, followed by transfer to the next process via a solution conveying pump.

It is preferable that filtration is carried out employing a filter at a particle catching diameter of 0.5-5 μm and a filtered water time of 10-25 seconds/100 ml. In the above method, aggregates remained during particle dispersion and formed during the addition of the major dope, are only removable by employing a filter at a particle catching diameter of 0.5-5 μm and a filtered water time of 10-25 seconds/100 ml.

In the major dope, since particle concentration is sufficiently low compared to that of the added solution, no abrupt increase in filtering pressure due to mutual adhesion of aggregates during filtration occurs.

FIG. 1 is a schematic view of one example of a dope preparation process, a casting process, and a drying process of the solution casting film producing method which is preferred in the present invention. If needed, large aggregates are removed via filtering device 44 from the acrylic particle preparation kettle 41, followed by transfer to stock kettle 42.

Thereafter, an acrylic particle adding solution is added to major dope dissolving kettle 1 from stock kettle 42. Thereafter, the major dope solution is filtered via major filtering device 3, followed by the inline addition of UV absorbing agent adding solution 16.

In many cases; the major dope occasionally incorporates side materials in an amount of about 10-about 50% by mass, Occasionally, the side materials include acrylic particles. In such a case, it is preferable to control the added amount of the acrylic particle adding solution matching to that of the added amount of the side materials.

"Side materials", as described herein, refer to ones which are produced by finely pulverizing acrylic-resin-containing films Available ones include trimmed portions of film of both edges formed during production of acrylic resin-containing film and mill rolls which are not within the specifications, for example, due to the presence of abrasion defects.

Further, preliminary mixed and pelletized ones of acrylic resin and acrylic particles can be preferably employed.

2) Casting Process

A casting process is one in which dope is transferred to pressurized die 30 via a solution sending pump (for example, a pressurized type quantitative gear pump) and is cast from the pressurized die slit onto the casting position on continuously moving looped metal belt 31 such as a stainless steel belt, or a rotating metal drum.

A pressurized die is preferred in which the slit shape of the metal portion of the die can be regulated to easily make the film thickness uniform. Pressurized dies include a coat hanger die and a T die, and any of these are preferably employed. The surface of metal supports is finished to be minor surface. In order to increase the film production rate, a multilayer may be realized in such a manner that at least two pressurized dies are provided on the metal support and the dope is divided into several portions. Alternately, it is also preferable to prepare a laminated structure film via a co-casting method in which a plurality of divided dope portions is simultaneously cast.

3) Solvent Evaporating Process

A solvent evaporating process is one in which a web (namely, a dope is cast onto a casting support and the resulting dope film is called a web) is heated on the casting support, whereby solvents evaporate.

Solvents are evaporated via a method in which air is blown from the web side and/or a method in which heat is transmitted via a liquid from the reverse side, and a method in which heat is transmitted via radiant heat from both the front and reverse surfaces. Of these, the reverse surface liquid heat transmission method is preferred since higher drying efficiency is realized.

Further, preferably employed are combinations of these methods. It is preferable that the web, on the support after casting, is dried on the support under an ambience of 40-100° C. In order to maintain the ambience of 40-100° C., it is preferable that airflow at the above temperature impinges the upper surface of the web, or heating is carried out via means such as infrared rays.

4) Peeling Process

A peeling process is one in which a web, from which solvents have been evaporated on the metal support, is peeled in a predetermined peeling position. The peeled web is conveyed to the following process.

Temperature in the peeling position on the metal support is preferably 10-40° C., but is more preferably 11-30° C.

The residual solvent amount while peeled in the web on the metal support is preferably in the range of 50-120% by mass in view of drying conditions and the length of the metal support. When peeled in the presence of a relatively large amount of residual solvents, the web is excessively soft, whereby flatness is deteriorated to tend to form wrinkles and longitudinal streaks caused by peeling tension. Consequently, the amount of residual solvents in the peeling position is determined via compatibility between an economical rate and quality.

The residual solvent amount in a web is defined by the following formula.

$$\text{Residual solvent amount}(\%) = (\text{weight of a web prior to a heat treatment} - \text{weight of the web after the heat treatment}) / (\text{weight of the web after the heat treatment}) \times 100$$

Heat treatment during determination of the residual solvent amount refers to one carried out at 115° C. for one hour.

Peeling tension during peeling of film from the metal support is commonly 196-245 N/m. However, when wrinkles tend to result, it is preferable that peeling is carried out under a tension of at most 190 N/m. Further, during peeling, the lowest peeling tension is preferably at most 166.6 N, is more preferably at most 137.2 N/m, but is most preferably at most 100 N/m.

In the present invention, temperature in the peeling position on the above metal support is preferably regulated to −50-40° C., more preferably to 10-40° C., but most preferably to 15-30° C.

5) Drying and Stretching Processes

After peeling, the web is dried employing dryer 35 in which the web is alternately passed through a plurality of rollers installed in the web dryer and/or tenter stretching apparatus 34 which conveys a web while clipping both edges of the web.

In common drying means, heated air is blown onto both sides of the web. Means are also available in which heating is carried out via application of microwaves instead of air flow. Excessively rapid drying tends to deteriorate flatness of the finished film.

High temperature drying is preferably carried out when the residual solvents reaches 8% by mass. Throughout the entire process, drying is carried out between about 40 to about 250° C., but is preferably carried out specifically between 40 to 160° C.

When a tenter stretching apparatus is employed, it is preferable to employ an apparatus which enables independent control of the film holding length (the distance from the holding initiation to the holding termination) at the right and the left.

Further, during the tentering process, to improve flatness, it is preferable to intentionally provide zones which differ in temperature. Further, it is also preferable to provide a neutral zone between temperature different zones so that adjacent zones result in no interference.

Stretching operation may be carried out in dividing into multiple stages. It is preferable to carry out biaxial stretching in the casting direction as well as in the lateral direction. Further, when biaxial stretching is carried out, simultaneous biaxial stretching may be employed, or it may be stepped stretching In the above case, "stepped" refers, for example, to a process in which it is possible to carry out sequential stretching which differs in stretching direction or in which it is possible to divide stepped stretching in the same direction and to add stretching in another direction in any of the steps. Namely, it is possible to employ, for example, the following stretching steps.

Stretching in the casting direction-stretching in the lateral direction-stretching in the casting direction-stretching in the casting direction Stretching in the lateral direction-stretching in the lateral direction-stretching in the casting direction-stretching in the casting direction Further, simultaneous biaxial stretching includes a case in which stretching is carried out in one direction and tension in another direction is relaxed to allow contraction. Stretching ratio of simultaneous biaxial stretching is preferably in the range of a factor of 1.01-1.5 in the lateral and longitudinal directions.

When tentering is carried out, the residual solvent amount in a web is preferably 20-100% by mass at the initiation of tentering. It is preferable that until the residual solvents in the web reaches at most 10% by mass, drying is carried out while tentering. The above residual solvent in the web is more preferably at most 5% by mass.

Drying temperature during tentering is preferably 30-150° C., is more preferably 50-120° C., but is most preferably 70-100° C.

During the tentering process, in view of enhancement of film uniformity, it is preferable that temperature distribution in the lateral direction under any ambience is small. The temperature distribution in the lateral direction during the tentering process is preferably ±5° C., is more preferably ±2° C., but is most preferably ±1° C.

6) Winding Process

A winding process is one in which, after the residual solvent amount in the web reaches at most 2% by mass, as an acrylic-resin-containing film, the resulting web is wound by winder 37. By realizing the residual solvent amount to be 0.4% by mass, it is possible to prepare a film which exhibits excellent dimensional stability.

Commonly employed methods may be employed as a winding method, and include a constant torque method, a constant tension method, a tapered tension method, and an internal stress constant program tension control method. Any of these may be appropriately selected and employed.

The acrylic-resin-containing film of the present invention is preferably a long-roll film. In practice, its length is about 100-about 5,000 m, and it is provided in a roll shape. Further, the film width is preferably 1.3-4 in, but is more preferably 1.4-2 m.

Thickness of the acrylic-resin-containing film of the present invention is not particularly limited. When it is employed as the polarizing plate protective film, described below, the thickness is preferably 20-200 μm, is more preferably 25-100 μm, but is most preferably 30-80 μm.

(Polarizing Plate)

It is possible to prepare the polarizing plate of the present invention by employing any common method. It is preferable that an adhesive layer is provided on the reverse side of the acrylic-resin-containing film of the present invention and the resulting acrylic-resin-containing film is adhered to at least one of the sides of a polarizer which is produced by immersion into an iodine solution, and then stretched.

Further, a surface treatment such as corona discharge treatment may be applied as appropriate. Adhesion to a polarizer can be improved by the surface treatment. On the other side, employed may be the film of the present invention or another polarizing plate protective film.

For example, preferably employed are commercial cellulose ester films (such as KONICA MINOLTA TAC KC8UX, KC4UX, KC5UX, KC8UY, KC4UY, KC12UR, KC8UCR-3, KC8UCR-4, KC8UCR-5, KC8UY-HA, and KC8UX-RHA, all produced by Konica Minolta Opto, Inc.) and cyclo olefin film (such as ZEONOA FILM produced by ZEON Corporation and ARTON FILM produced by JSR).

A polarizer, which is a major constitutional component of the polarizing plate, is an element which transmits light in a polarized wave plane in a specific direction. The representative polarizing film, which is presently known, is a polyvinyl alcohol based polarizing film, which includes one dyed with iodine and the other which is dyed with dichroic dyes.

The employed polarizer is prepared as follows. A film is prepared employing an aqueous polyvinyl alcohol solution. The resulting film is uniaxially stretched, followed by dying, or after dying, it is uniaxially stretched, followed by an endurance enhancing treatment, by preferably employing boron compounds.

It is preferable to employ adhesive agents used in the above adhesive layer so that at least one portion of the adhesive layer exhibits a storage elastic modulus in the range of $1.0 \times 10^4$-$1.0 \times 10^9$ Pa at 25° C. Curing type adhesive agents are appropriately employed, which form high molecular weight compounds, or crosslinking structures via various chemical reactions after coating the above adhesives, followed by adhesion.

Specific examples thereof include such as urethane based adhesive agents, epoxy based adhesive agents, aqueous polymer-isocyanate based adhesive agents, curing type adhesive agents such as a thermally cured type acrylic adhesive agent, moisture cured urethane adhesive agents, anaerbiotic adhesive agents such as polyether methacrylate types, ester based methacrylate types, or oxidation type polyether methacrylates, cyanoacrylate based "instant" adhesive agents, and acrylate and peroxide based dual liquid type "instant" adhesive agents.

The above adhesive agents may be either of a single liquid type, or of a type such that prior to use, at least two liquids are blended. Further, the above adhesive agents may be of a solvent based type in which organic solvents are employed as a medium, of an aqueous type such as an emulsion type, a colloid dispersion type, or an aqueous solution type in which media are composed of water as a major component, or may be of a non-solvent type.

Concentration of the above adhesive agent solution may be appropriately determined depending on the film thickness after adhesion, the coating method, and the coating conditions, and is commonly 0.1-50% by mass.

(Liquid Crystal Display Device)

By incorporating a polarizing plate, adhered together with the acrylic-resin-containing film of the present invention, in a liquid crystal display device, it is possible to produce a liquid crystal display device which excels in various kinds of visibility. The polarizing plate according to the present invention is adhered to liquid crystal cells via the above adhesive layer.

The polarizing plate according to the present invention is preferably employed in a reflection type, transparent type, or semi-transparent type LCD, or in various driving system LCDs such as a TN type, an STN type, an OCB type, an HAN type, a VA type (a PVA type and an MVA type), and an IPS type (including an FFS system).

Specifically in a large screen display device, particularly a screen of at least 30 type, especially of 30-54 type, no white spots occur at the periphery of the screen and its effect is maintained over an extended duration. Further, effects are realized in which color shade, glare, and wavy mottling are minimized, and eyes do not tire even when viewing over an extended duration.

EXAMPLES

The present invention will now be specifically described with reference to examples, however the present invention is not limited thereto.

(Synthesis of Indene-Methymethacrylate Copolymer (D1))

Into 50 ml of three-neck flask with stirrer and reflux condenser tube, 5 g of indene, 5 g of methylmetacrylate, 30 g of toluene was fed and stirred to uniform in a water bath at 25° C. Then polymerization was started by adding 0.05 g of ferric chloride. At 1 hour after starting reaction, further 0.09 g of ferric chloride (III) was added.

In the same manner, 0.09 g of ferric chloride (III) each was added at 3, 4, 5 hours after starting reaction. At 24 hour after starting reaction, 50 ml of methanol was added to precipitate polymer and terminate a reaction. Prepared polymer was filtered, fully washed by methanol and then water, dried under reduced pressure to eliminate residual methanol and indene-methymethacrylate copolymer (D1) was obtained. A weight-average molecular weight (Mw) was 100,000 and Tg was 140° C.

<Preparation of Acrylic-Resin-Containing Films>
(Preparation of Acrylic-Resin-Containing Film 1)
(Preparation of Dope Liquid Composition)

| | |
|---|---|
| BR85 (produced by Mitsubishi Rayon Co., Ltd.) | 70 parts by mass |
| Cellulose ester (cellulose acetate propionate at a total substitution degree of an acyl group of 2.7, a substitution degree of an acetyl group of 0.19, a substitution degree of a propionyl group of 2.56, and Mw of 200,000, Tg 144° C.) | 20 parts by mass |
| Cellulose ester (cellulose acetate propionate at a total substitution degree of an acyl group of 2.73, a substitution degree of an acetyl group of 1.41, a substitution degree of a propionyl group of 1.36, and Mw of 200,000, Tg 165° C.) | 10 parts by mass |
| Methylene chloride | 300 parts by mass |
| Ethanol | 40 parts by mass |

(Preparation of Acrylic-Resin-Containing Film)

The dope liquid, prepared as above, was uniformly cast onto a 2 m wide stainless steel band support at 22° C., employing a belt casting apparatus. Solvents were evaporated on the stainless steel band support so that the residual solvent amount reached 100%, and the resulting film was peeled from the stainless steel band via a peeling tension of 162 N/m.

The peeled acrylic resin web was heated at 35° C. to evaporate solvents and was slit to a 1.6 m width. Thereafter, while being stretched by a factor of 1.1 in the lateral direction via a tenter, drying was carried out carried out at a drying temperature of 135° C. When stretching was initiated via the tenter, the amount of residual solvents was 10%.

After tenter stretching, relaxation was allowed out for 5 minutes at 130° C. Thereafter, drying was completed via conveyance into 120° C. and 130° C. drying zones employing numerous rollers, and slitting was carried out for a 1.5 m width. Subsequently, a knurling treatment of a width of 10 mm and a height of 5 μm was applied to both edges, followed by winding onto a core of an internal diameter of 6 inches under an initial tension of 220 N/m and a final tension of 110 N/m, whereby Acrylic-resin-containing Film 1 was prepared.

The stretching magnitude in the MD direction, calculated based on the rotation rate of the stainless steel band support and the driving rate of the tenter, was at a factor of 1.1.

The residual solvent amount, film thickness and roll length of Acrylic-resin-containing Film 1, described in Table 1, were 0.1%, 60 μm, and 4,000 m, respectively.

Acrylic-resin-containing Films 2-43 were prepared in the same manner as above Acrylic-resin-containing Film 1, except that types and composition ratios of acrylic resin (A), cellulose ester resin (B) and resin (D) were changed as listed in Table 1.

Materials used in Table 1 are as below.

| Abbreviation | Weight-average molecular weight | Composition |
|---|---|---|
| BR52 | 85,000 | MS |
| BR80 | 95,000 | MMA |
| BR83 | 40,000 | MMA |
| BR85 | 280,000 | MMA |
| BR88 | 480,000 | MMA |
| MR102 | 360,000 | MMA |
| 80N | 100,000 | MMA |

Abbreviations and species are as follows:
MS: methylacrylate-styrene copolymer
MMA: methylmethacrylate BR series and 80N each is Delpet 80N (manufactured by Asahi Kasei Chemicals Corporation) and DIANAL BR52, DR83, BR85, BR88 and BR102 (manufactured by Mitsubishi Rayon co., Ltd.).

A1-A4 were prepared by well-known method. Compositions were as follows:

| | | |
|---|---|---|
| A1: poly(MMA-MA) | ratio by mass 98:2 | Mw 70,000 |
| A2: poly(MMA-MA) | ratio by mass 97:3 | Mw 800,000 |
| A3: poly(MMA-MA) | ratio by mass 97:3 | Mw 930,000 |
| A4: poly(MMA-MA) | ratio by mass 94:6 | Mw 1100,000 | ac: 1.92, p: 0.74 means cellulose ester having a degree of substituent of acetyl group 1.92 and a degree of substituent of propionyl group 0.74. Further, b, bz, pi and ph each represent cellulose ester substituted by butylate, benzoate, pivalate and phthalate, respectively.

COP: cycloolefin polymer Mw 129,000 (ARTON (manufactured by JSR)), Tg=171° C.

OAcSc: octa acetyl succharose Mw 680 (manufactured by Tokyo Kasei), Tg=95° C.

Herein, Acrylic-resin-containing film 20 and 23 were prepared by adding UV absorbent below.

| Acrylic-resin-containing film 20 | |
|---|---|
| Tinubin 109 (manufactured by Ciba Specialty Chemicals) | 1.5 parts by mass |
| Tinubin 171 (manufactured by Ciba Specialty Chemicals) | 0.7 parts by mass |
| Acrylic-resin-containing film 23 | |
| LA-31 (manufactured by ADEKA) | 1.5 parts by mass |

TABLE 1

| | Cellulose ester resin (B) | | | | | | | |
|---|---|---|---|---|---|---|---|---|
| | ac | p | b | bz | pi | ph | T | Mw |
| 1 | 0.19 | 2.56 | | | | | 2.75 | 200,000 |
| 2 | 0.19 | 2.56 | | | | | 2.75 | 210,000 |
| 3 | 0.19 | 2.56 | | | | | 2.75 | 250,000 |
| 4 | 0.19 | 2.56 | | | | | 2.75 | 85,000 |
| 5 | 0.30 | | 2.30 | | | | 2.60 | 160,000 |
| 6 | 0.50 | 1.20 | 1.20 | | | | 2.90 | 180,000 |
| 7 | 1.00 | 1.50 | | | | | 2.50 | 120,000 |
| 8 | 1.00 | | 1.50 | | | | 2.50 | 150,000 |
| 9 | 1.08 | | 1.84 | | | | 2.92 | 230,000 |
| 10 | 1.20 | | | 1.30 | | | 2.50 | 120,000 |
| 11 | 1.41 | 1.32 | | | | | 2.73 | 200,000 |
| 12 | 1.50 | | | 1.30 | | | 2.80 | 244,000 |
| 13 | 1.50 | | | | 1.30 | | 2.80 | 192,000 |
| 14 | 0.19 | 2.56 | | | | | 2.75 | 170,000 |
| 15 | 0.19 | 2.56 | | | | | 2.75 | 280,000 |
| 16 | 0.30 | 1.50 | | | | | 1.80 | 130,000 |
| 17 | 1.00 | | 1.50 | | | | 2.50 | 40,000 |
| 18 | 1.05 | 1.00 | | | | | 2.05 | 180,000 |
| 19 | 1.50 | | 0.70 | | | | 2.20 | 145,000 |
| 20 | 1.92 | 0.74 | | | | | 2.66 | 178,000 |
| 21 | 2.00 | 0.50 | | | | | 2.50 | 220,000 |
| 22 | 2.90 | | | | | | 2.90 | 200,000 |
| 23 | 2.12 | | 0.74 | | | | 2.86 | 204,000 |
| 24 | 1.20 | | | | | 1.30 | 2.50 | 110,000 |
| 25 | 1.20 | | | | | 1.30 | 2.50 | 160,000 |

Table 1, ac, p, bz and ph represents the same composition described above and T represents degree of the total substitution.

As comparative sample, the thermoplastic copolymer disclosed in Example 1 of JP-A 2007-191706 was prepared and the pellet composition was prepared based on Example 7 in the same patent to obtain Comparative sample 44 with layer thickness of 60 μm.

Further, the optical film disclosed in Example 1 of JP-A 2007-233114 was prepared to obtained Comparative sample film 45.

<<Evaluation Method>>

Resulting Acrylic-resin-containing films 1-45 were evaluated as follows. Results were shown in Tables 2 to 4.

(Haze)

With regard to the film samples prepared as described above, a film sample sheet was humidity conditioned at 23° C., 55% R.H. in 24 hours in air-conditioned room and followed by evaluation via a haze meter (Type NDH 2000, produced by Nippon Denshoku Industries Co., Ltd.) based on JIS K 7136.

(Tension Softening Point)

The following evaluation was carried out employing a TENSIRON tester (RTC-1225A, produced by ORIENTEC Co., Ltd.).

Acrylic-resin-containing film was cut to 120 mm (longitudinal)×10 mm (vertical). While pulling the resulting sheet under a tension of 10 N, temperature was raised at a rate of 30° C./minute, and temperature which resulted in 9N was determined thrice, followed by calculation of the average.

(Glass Transition Temperature)

Midpoint glass transition temperature (Tmg) was referred to Glass transition temperature which was evaluated by using Differential scan calorimeter (DSC-7 produced by Perkin Elmer) under the condition that temperature was raised at a rate of 20° C./minute and by calculation based on JIS K7121 (1987).

(Ductile Fracture: Brittleness Evaluation)

Acrylic-resin-containing film was humidity conditioned at 23° C., 55% R.H. in 24 hours in air-conditioned room and was cut to 100 mm (longitudinal)×10 mm (vertical). The resulting sheet was subjected to one mountain fold and one valley fold in the longitudinal direction in the central portion. The above test was carried out thrice, and evaluation was made based on the following criteria Incidentally, "fold", as described in the evaluation, means that the sheet is broken up into at least two portions.

A: no fold was noted during three tests
B: at least one fold was noted during three tests (Dimensional Change Due to Humidity Change)

Two positions on the prepared film were marked (with +) in the casting direction. The marked film was treated at 60° C. and 90% relative humidity for 1,000 hours. Prior to and after the treatment, the distance between the marks (+ marks) was determined via an optical microscope, and evaluation was performed based on the following criteria Dimensional change ratio(in %)=[($a1-a2$)/$a1$]×100 wherein "a1" represents the distance prior to treatment, while "a2" represents the distance after treatment.

A: less than 0.3%
B: at least 0.3%-less than 0.5%
C: at least 0.5%

(Durability by Repeated Thermo Tests)

Cycle thermo durability (1 cycle was comprised of 60° C.→−20° C.→60° C.) was repeated 300 times in which prepared films were allowed to stand at −20° C. and 60° C. in 30 minutes each in a manner of standing at 60° C. for 30 minutes in thermostatic chamber, then standing at −20° C. for 30 minutes in thermostatic chamber, and again standing at 60° C. in thermostatic chamber. Thus, durability after cycle thereto durability was evaluated under the condition of 23° C. and 55% relative humidity based on the following criteria:

Crack generation was observed by visual inspection under an optical microscope at hundred-fold magnification A: No increase of haze and no crack generation was observed.
B: Haze was slightly observed but no crack generation was observed.
C: Increase of haze and crack generation was observed.

(Cutting Property)

Each film was humidity conditioned under the condition of 23° C. and 55% relative humidity for 24 hours and then torn via a light load tearing meter (Elmendorf type) (produced by Toyo Seiki Seisaku-sho, Ltd.) under the same condition, and was evaluated based on the following criteria.

A: the torn plane was very smooth, and straight tearing resulted
B: the torn plane resulted in slight weld flash, and tearing resulted in a straight line
C: the torn plane resulted in significant weld flash, and tearing resulted in no straight line (Film Appearance)

Appearance of each of the prepared films was visually observed and evaluated based on the following criteria.

A: a very smooth plane was noted
B: slightly stretches, wrinkles, and steps were noticed
C: obvious stretches, wrinkles, and steps were noticed (Preparation of Polarizing Plate)

A 120 μm thick polyvinyl alcohol film in a long-length roll was immersed into 100 parts by an aqueous solution incorporating 1 part by mass of iodine and 4 parts by mass of boric acid and was stretched at 50° C. by a factor of 5 in the conveying direction, whereby a polarizing film was prepared. Subsequently, the above polarizing film, onto which acrylic adhesive agents were applied, was adhered onto the acrylic-resin-containing film prepared in Example 1, which had been subjected to a corona treatment. Further, KC8UCR-5, produced by Konica Minolta Opto, Inc., which is a retardation film treated with an alkali saponification treatment, was adhered onto the other side, followed by drying, whereby Polarizing Plate 1 was prepared. In the same manner as above, Polarizing Plates 2-44 were prepared by employing Acrylic-resin-containing Films 2-44.

Polarizing plates employing each of the acrylic-resin-containing film films of the present invention excelled in film cutting property, resulting in easier treatments.

(Evaluation of Characteristic as Liquid Crystal Display Device)

<Preparation of Liquid Crystal Display Devices>

Polarizing plates on both sides, adhered to 32 type television AQ-32AD5, manufactured by Sharp Corp., were peeled away. Each of the polarizing plates prepared as above was adhered so that KC8UCR-5 was arranged on the glass surface side of the liquid crystal cell and the absorption axis was directed in the same direction of the previously adhered polarizing plate, whereby each of the liquid crystal display devices was prepared.

(View Angle Variation)

The following evaluations were carried out employing Liquid Crystal Display Devices 1-45, prepared as above.

The view angle of liquid crystal display devices was determined by employing EZ-CONTRAST 160D, produced by ELDIM Co. in an ambience of 23° C. and 55% relative humidity. Subsequently, the above polarizing plate was allowed to stand at 60° C. and 90% relative humidity over 1,000 hours, and the resulting view angle was determined in the same manner as above. The resulting values were subjected to 4 levels of evaluation based on the following criteria.

A: no view angle variation was noted
B: slight view angle variation was noted
C: view angle variation was noted
D: significant view angle variation was noted (Color Shift)

Liquid Crystal Display Devices 1-43 were prepared by adhering polarizing plate in the same manner as view angle evaluation above.

Subsequently, the display was subjected to black display and observation of color shift was carried out at a skew angle of 45° at 23° C. and 55% relative humidity. The resulting color shift was evaluated based on the following criteria.

A: no color shift was noted
B: slight color shift was noted
C: color shift was noted
D: significant color shift was noted Tables 2 to 4 show the evaluation results.

TABLE 2

| | Acrylic resin (A) | | Cellulose ester resin (B) | | | *2 |
|---|---|---|---|---|---|---|
| *1 | First | Second | B1 | B2 | Resin (D) | (A)/(B)/(D) |
| 1 | BR85 | — | 1 | 11 | | 70/20 + 10/0 |
| 2 | | | 1 | 11 | | 95/3 + 2/0 |
| 3 | | | 1 | 11 | | 88/6 + 6/0 |
| 4 | | | 1 | 11 | | 50/25 + 25/0 |
| 5 | | | 1 | 11 | | 35/35 + 30/0 |
| 6 | | | 1 | 11 | | 28/40 + 32/0 |
| 7 | | | 1 | 11 | | 68/30 + 2/0 |
| 8 | | | 1 | 11 | | 68/2 + 30/0 |
| 9 | | | 1 | | | 30/70/0 |
| 10 | | | 1 | | 20 | 70/20 + 10/0 |
| 11 | | | 1 | | 23 | 70/20 + 10/0 |
| 12 | | | 1 | 12 | | 70/20 + 10/0 |
| 13 | | | 1 | 13 | | 70/20 + 10/0 |
| 14 | | | 1 | 25 | | 70/20 + 10/0 |
| 15 | | | 1 | | ARTON | 75/24/1 |
| 16 | | | 1 | | OAcSc | 70/20/10 |
| 17 | | D1 | 1 | | | 70 + 20/10/0 |
| 18 | | — | 9 | 11 | | 70/20 + 10/0 |
| 19 | BR85 | BR102 | 1 | | | 70/20 + 10/0 |
| 20 | D1 | — | 1 | 11 | | 70/20 + 10/0 |
| 21 | BR52 | — | 1 | 11 | | 70/20 + 10/0 |
| 22 | BR85 | — | 2 | 8 | | 70/20 + 10/0 |
| 23 | | | 3 | 11 | | 70/20 + 10/0 |
| 24 | | | 15 | 11 | | 70/20 + 10/0 |
| 25 | 80N | — | 5 | 11 | | 70/20 + 10/0 |
| 26 | BR85 | — | 11 | 17 | | 70/20 + 10/0 |
| 27 | | | 11 | 14 | | 70/20 + 10/0 |
| 28 | | | 4 | 11 | | 70/20 + 10/0 |
| 29 | | | 11 | 21 | | 70/20 + 10/0 |
| 30 | | | 11 | 18 | | 70/20 + 10/0 |
| 31 | | | 11 | 16 | | 70/20 + 10/0 |
| 32 | | | 7 | 11 | | 70/20 + 10/0 |
| 33 | | | 8 | 11 | | 70/20 + 10/0 |
| 34 | | | 10 | 11 | | 70/20 + 10/0 |
| 35 | | | 11 | 24 | | 70/20 + 10/0 |

TABLE 2-continued

|  | Acrylic resin (A) | | Cellulose ester resin (B) | | | *2 |
| --- | --- | --- | --- | --- | --- | --- |
| *1 | First | Second | B1 | B2 | Resin (D) | (A)/(B)/(D) |
| 36 |  |  | 11 | 19 |  | 70/20 + 10/0 |
| 37 | BR88 | — | 6 | 11 |  | 70/20 + 10/0 |
| 38 | BR85 | — | 11 | 22 |  | 70/20 + 10/0 |
| 39 | BR83 | — | 1 | 11 |  | 70/20 + 10/0 |
| 40 | A1 | — | 1 | 11 |  | 70/20 + 10/0 |
| 41 | A2 | — | 1 | 11 |  | 70/20 + 10/0 |
| 42 | A3 | — | 1 | 11 |  | 70/20 + 10/0 |
| 43 | A4 | — | 1 | 11 |  | 70/20 + 10/0 |
| 44 | Film according to Examples 1 and 7 in JP-A No. 2007-191706 | | | | | |
| 45 | Film according to Example 1 in JP-A No. 2007-233114 | | | | | |

*1: No. of Acrylic-resin-containing film
*2: Composition ratio (by mass)

TABLE 3

| *1 | Haze (%) | Tensile softening point(° C.) | Ductile fracture | Durability by repeated thermo tests | Film deformation | Cutting | Visual appearance | Fluctuation of view angle | Color shift | Remarks *2 |
| --- | --- | --- | --- | --- | --- | --- | --- | --- | --- | --- |
| 1 | 0.23 | 126 | A | A | A | A | A | B | B | Inv. |
| 2 | 0.56 | 106 | B | B | B | C | B | D | D | Comp. |
| 3 | 0.52 | 114 | A | B | B | B | B | C | C | Comp. |
| 4 | 0.92 | 126 | A | A | A | A | A | C | C | Inv. |
| 5 | 1.20 | 130 | A | B | B | A | B | C | C | Inv. |
| 6 | 3.20 | 133 | A | C | B | B | C | D | D | Comp. |
| 7 | 0.30 | 118 | A | B | B | B | B | C | C | Comp. |
| 8 | 8.20 | 102 | B | C | B | C | C | D | D | Comp. |
| 9 | 0.47 | 133 | A | A | C | A | B | D | D | Comp. |
| 10 | 0.61 | 132 | A | A | A | A | A | B | B | Inv. |
| 11 | 0.50 | 125 | A | A | A | A | A | B | B | Inv. |
| 12 | 0.40 | 135 | A | A | A | A | A | B | B | Inv. |
| 13 | 0.42 | 136 | A | A | A | A | A | B | B | Inv. |
| 14 | 0.77 | 132 | A | A | A | B | B | B | B | Inv. |
| 15 | 1.50 | 132 | A | B | A | A | A | B | B | Inv. |
| 16 | 0.30 | 100 | B | C | B | B | A | C | D | Comp. |
| 17 | 0.79 | 122 | A | B | A | B | B | B | B | Inv. |
| 18 | 0.44 | 123 | A | B | A | A | A | B | B | Inv. |
| 19 | 0.33 | 98 | B | B | C | B | A | D | D | Comp. |
| 20 | 0.92 | 146 | A | B | A | B | B | B | B | Inv. |
| 21 | 0.30 | 125 | A | A | A | B | A | B | B | Inv. |
| 22 | 0.32 | 126 | A | A | A | A | B | B | C | Inv. |
| 23 | 0.33 | 127 | A | A | A | A | B | B | C | Inv. |
| 24 | 0.33 | 128 | A | A | A | B | B | B | C | Inv. |

*1: No. of polarizing plate and Liquid crystal display device
*2: Inv.: Inventive example, Comp.: Comparative example

TABLE 4

| *1 | Haze (%) | Tensile softening point(° C.) | Ductile fracture | Durability by repeated thermo tests | Film deformation | Cutting | Visual appearance | Fluctuation of view angle | Color shift | Remarks |
| --- | --- | --- | --- | --- | --- | --- | --- | --- | --- | --- |
| 25 | 0.27 | 123 | A | A | A | A | A | B | B | Inv. |
| 26 | 0.35 | 125 | B | A | A | C | B | C | C | Comp. |
| 27 | 0.35 | 125 | B | A | A | B | B | C | C | Comp. |
| 28 | 0.33 | 123 | A | A | B | B | A | B | C | Inv. |
| 29 | 0.57 | 129 | A | A | B | B | B | B | C | Inv. |
| 30 | 0.63 | 127 | A | A | B | B | B | B | C | Inv. |
| 31 | 12.30 | 102 | B | C | B | C | C | D | D | Comp. |
| 32 | 0.25 | 128 | A | A | A | A | A | B | B | Inv. |
| 33 | 0.24 | 124 | A | A | A | A | A | B | B | Inv. |
| 34 | 0.27 | 137 | A | A | A | B | A | B | B | Inv. |
| 35 | 0.88 | 130 | A | A | A | B | B | B | C | Inv. |
| 36 | 9.70 | 109 | B | C | B | C | C | D | D | Comp. |
| 37 | 0.36 | 126 | A | A | A | A | A | B | B | Inv. |
| 38 | 13.70 | 107 | B | C | B | C | C | D | D | Comp. |
| 39 | 0.39 | 126 | B | A | A | C | A | B | C | Comp. |
| 40 | 0.38 | 125 | B | A | A | B | A | B | C | Comp. |

TABLE 4-continued

| *1 | Haze (%) | Tensile softening point(° C.) | Ductile fracture | Durability by repeated thermo tests | Film deformation | Cutting | Visual appearance | Fluctuation of view angle | Color shift | Remarks |
|---|---|---|---|---|---|---|---|---|---|---|
| 41 | 0.77 | 126 | A | B | A | B | B | B | B | Inv. |
| 42 | 0.92 | 123 | A | B | A | B | B | B | C | Inv. |
| 43 | 2.30 | 119 | A | B | A | C | C | C | C | Comp. |
| 44 | 3.50 | 117 | B | C | A | C | A | C | C | Comp. |
| 45 | 0.80 | 115 | A | C | B | B | A | C | C | Comp. |

*1: No. of polarizing plate and Liquid crystal display device
*2: Inv.: Inventive example, Comp.: Comparative example The acrylic-resin-containing film of the present invention exhibits high transparency, high heat resistance, and markedly improved brittleness. Further, it was found that the polarizing plate using the acrylic-resin-containing film of the present invention improves a yield of operation such as punching of a polarizing plate or bonding panels and can keep to exhibit excellent visibility in long-terms usage in harsh environment.

What is claimed is:

1. An acrylic-resin-containing film comprising an acrylic resin (A), a cellulose ester resin (B1) and at least one selected from a cellulose ester resin (B1) which is another species of said cellulose ester resin (B1), a cellulose ester resin (B2), and a resin (D) which is other than the resins (A), (B1) and (B2), wherein
   the acrylic resin (A) has a weight-average molecular weight of 80,000-1,000,000,
   the cellulose ester resin (B1) has
      a degree of total substitution of an acyl group (T) being 2.00-2.99,
      a degree of substitution of an acetyl group (ac) being 0.10-1.89,
   groups other than acetyl group are substituted by acyl groups having 3-7 carbon atoms,
   a degree of substitution of the group (r) being 1.10-2.89, and
      a weight-average molecular weight is 75,000-250,000,
   the cellulose ester resin (B2) has
      the total substitution degree of the acyl group (T) is 1.0-2.99,
      the substitution degree of the acetyl group (ac) is 0.10-2.99, and
      the substitution degree of other than acetyl group (r) is 0-2.89, and
   the resin (D) has a glass transition temperature Tg of 120-300° C., wherein
   the acrylic-resin-containing film has a haze of less than 2%, a tensile softening point of 120-150° C. and undergoes no ductile fracture.

2. The acrylic-resin-containing film of claim 1, comprising 30-90% by mass of the acrylic resin (A), 5-65% by mass of the cellulose ester resin (B), and 0-50% by mass of the resin (D) which is other than the resins (A) and (B) and have a glass transition temperature Tg of 120-300° C.

3. The acrylic-resin-containing film of claim 1, wherein the haze is less than 1%.

4. A polarizing plate comprising the acrylic-resin-containing film of claim 1 onto at least one side thereof.

5. A liquid crystal display device comprising the acrylic-resin-containing film of claim 1.

6. The acrylic-resin-containing film of claim 2, wherein the haze is less than 1%.

7. A polarizing plate comprising the acrylic-resin-containing film of claim 2 onto at least one side thereof.

8. A liquid crystal display device comprising the acrylic-resin-containing film of claim 2.

* * * * *